May 13, 1930.  H. J. LUCKE  1,758,573
VENTILATING DEVICE FOR AUTOMOBILES AND OTHER VEHICLES
Filed Sept. 4, 1926
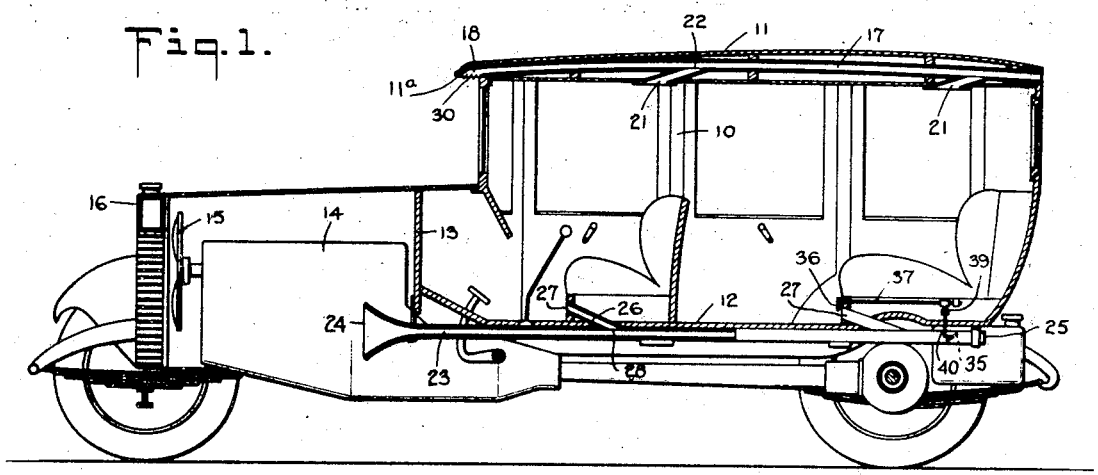
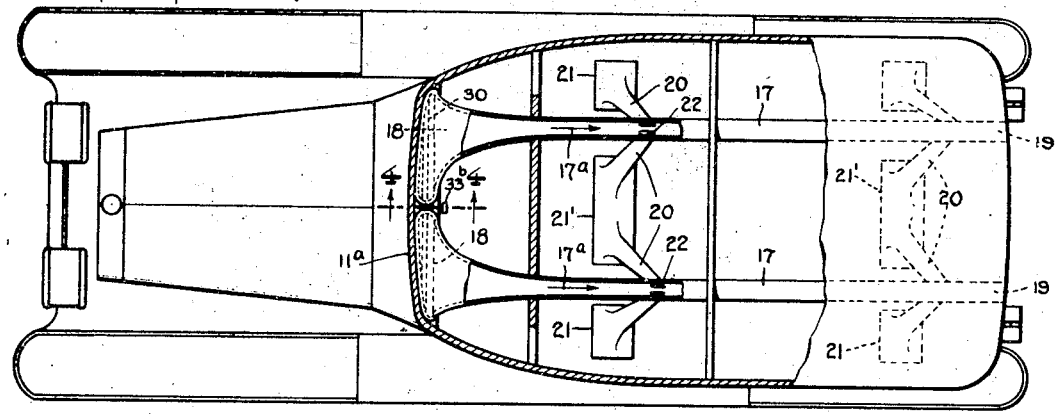
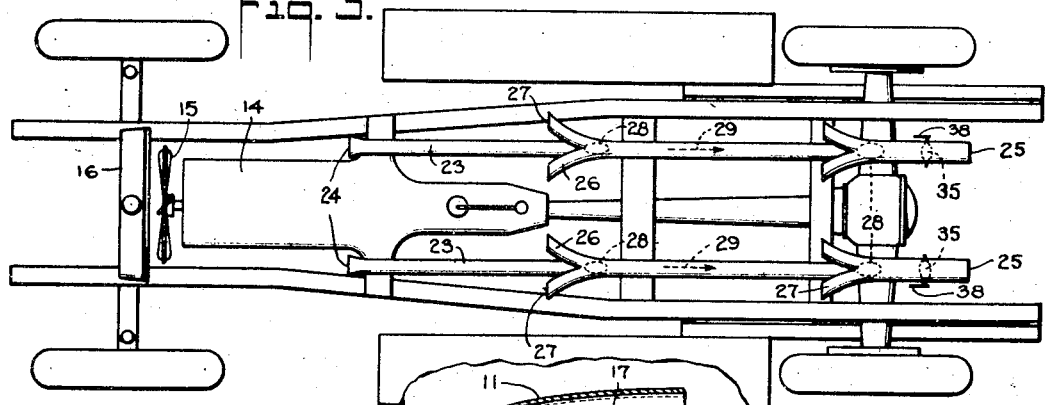
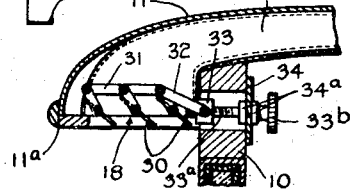
INVENTOR,
Henry J. Lucke Patented May 13, 1930

1,758,573

UNITED STATES PATENT OFFICE

HENRY J. LUCKE, OF EAST ORANGE, NEW JERSEY

VENTILATING DEVICE FOR AUTOMOBILES AND OTHER VEHICLES

Application filed September 4, 1926. Serial No. 133,603.

This invention relates to ventilating devices for automobiles and other vehicles.

Pursuant to my invention, the automobile, especially for sedan or other closed car bodies, is provided with a set of discharge openings for the efflux of air from the interior of the car body, arranged upon the travel of the automobile or other vehicle, that the air within the interior of the vehicle body is positively discharged under regulation.

My invention is particularly adapted for privately operated or publicly operated motor cars, to provide for positive ventilation of the interior of the car body, and to supply the air in replacement of the "used" air from the front and sides of the car, and thus prevent the exhaust gases from entering the interior of the car body.

As a preferred form of my invention, the top of the automobile body or roof of the vehicle is provided with one or more channels extending from the front toward the rear whereby the pressure of the air ensuing upon the forward travel of the vehicle, creates a positive travel of air through such channel or channels. Associated with such channel or channels are a suitable number of passages, each communicating at one end with the interior of the vehicle body and at its opposite end with its channel at an angle acutely inclined toward the front of the vehicle, whereby upon the travel of the air through each channel, the air of the interior of the vehicle body is positively entrailed through such one or more inflow passages and forced from the interior of the car body. Such ventilating device serves to effect the removal of the air from the upper regions of the interior of the car body.

For removal of the air from the lower regions of the interior of the vehicle body, I provide a suitable number of channels, each in the form of a tube disposed below and supported from the car body and extending from the front toward the rear of the car body. The front end may be disposed in advance of the dash or other partition between the interior of the hood and the interior of the car body, for directly receiving the air passing through the radiator clearances and accelerated by the fan of the motor. With such one or more lowerly disposed channels, I arrange inflow passages communicating adjacent the seats for removal of the air from the lower regions of the interior of the vehicle body.

Further features and objects of the invention will be more fully understood from the following detail description and the accompanying drawings, in which Fig. 1 is a vertical central sectional elevation, showing my invention applied to the top and the floor of a sedan automobile;

Fig. 2 is a top plan view of the automobile shown in Fig. 1, with a portion of the top of the automobile broken away in central horizontal section, to show otherwise hidden parts;

Fig. 3 is a top plan view of the chassis of an automobile, illustrating one form of assembly of the lower ventilating channels; and Fig. 4 is a detail view on line 4—4 of Fig. 2.

Referring to Figs. 1 and 2, the car body 10 is of the usual or other approved type, comprising a top proper 11 and a floor 12. The dash is indicated at 13, the motor at 14, the motor fan at 15 and the radiator at 16.

In these figures I have illustrated two upper air channels 17, each in the form of a tube of metal or the like or built in channel form as a part of the top, and having a laterally flared inlet 18 disposed at or adjacent the front edge 11$^a$ of the top 11 and an outlet 19 of any suitable form. Intermediate the inlet 18 and the outlet 19 of each channel, I provide one or more sets of ventilating passages 20 having inlets 21 communicating with the interior of the car body, and in this instance, with the upper regions of the interior of the car. It is advantageous to join the adjacent passages 20 of the respective channels 17 and thus provide for common inlets 21, as appears in Fig. 2. Each of such ventilating passages 20 is positioned at an acute angle to the direction of flow of the air indicated by the arrow 17$^a$, induced by the forward travel of the car through its channel 17 at the location of its outlet 22, to effect the positive withdrawal of air through each ventilating passage 20 by the flow of air through its channel 17.

In a similar manner, the set of channels 23 are provided for the lower portion of the car body 10, as for example, each in the form of a tube having an enlarged inlet 24, as by flaring vertically as well as horizontally, and a suitable outlet 25, and branch passages 26 having inlets 27 communicating with the lower regions of the interior of the car and joining at their outlets 28 at an acute angle to the direction of flow of the air, shown by the arrow 29, in the channels 23, as appears in Fig. 3. The flow of air through such lower channels 23 induced through the radiator and interior of the hood ensuing upon the forward travel of the car is accelerated by the motor fan 15, which may be increased in speed or size, or otherwise, to increase the speed of the impelled air currents. Such lower pipes 23 are preferably rigidly secured to the permanent portions of the floor 12 of the car body and the branch pipes 26 rigidly positioned in the concealed parts of the front and rear seats as shown in Fig. 1, thus concealing the pipes and preventing vibration and also virtually concealing the inlets 27 by locating the same in the vertical front or rear sides of the lower portions of the front seat and the front sides of the rear seat.

The regulation of the effective amount of air induced through the ventilating passages 20 may be had by any suitable means, as for example, a set of butterfly valves 30, see Figs. 1, 2 and 4, jointly controlled by an interconnecting link 31, connected by the control link 32 to the nut 33 meshing with the threaded rod 33ᵃ having a knurled head 33ᵇ, or equivalent, accessible within the interior of the car body 10. The rod 33ᵃ is retained in position in a suitable opening in the plate 34 by the oppositely disposed collars 34ᵃ.

The above arrangement is of convenience for ventilating the interior of the car by regulated positive drive of the air both upwardly and downwardly in the interior of the car, without the expenditure of useful energy by the motor or otherwise, and in fact reducing the effective resistance of the car body against the atmospheric body of air and assisting in the cooling of the motor and the interior of the hood. Such ventilation within the interior of the car body by a plurality of currents of air in different directions, prevents the formation of any so-called draft.

For attaining the heating of the car as in winter or other reduced atmospheric temperature conditions, I provide a regulator 35 for shutting off partially or wholly the outlets 25 of the lower channels 23, whereby the air heated by the radiator and impelled by the motor fan, and further heated by traversing the exterior surfaces of the motor and otherwise through the interior of the hood, is forced partially or wholly through the respective passages 26, through the spaced outlets 27 into the lower regions of the interior of the car body. Such supplied heated air rises by convection within the interior of the car when the regulators 30 of the upper channels 17 are fully shut-off; the upward travel of the heated air is accelerated by partially or wholly opening the regulators 30.

To facilitate the joint operation and setting of the regulators 35 for the lower channel means 23, I have indicated a system of levers comprising the operating handle 36, disposed within the interior of the car, as at the front side of the lower portion of the rear seat, and connected to the oscillatable shaft 37, in turn connected to the arm 38 of each valve 35 by a lever 39 and link 40.

If desired, a regulator for the inlets of the lower channel means 23 similar to the regulator for the upper channel means 17, may be employed.

My channel means 23, illustrated for ventilating the lower regions of the interior of the car body either at atmospheric temperature or regulated elevated temperatures are adapted for use without any upper channel means, as well as with upper channel means when in fully shut-off position. When my invention is carried out by the use of conjointly ventilated and heating means, the channels 23 may be provided with relatively enlarged inlets 24, to thereby derive a large extent of flow of the air through the same, to attain a capacity of increased degree of ventilation either at atmospheric temperatures or elevated temperatures.

The form of my invention for ventilating the lower regions of the interior of the car may be manufactured as an accessory for installation in completed car bodies.

It will be observed that my channel means for ventilation to the lower regions of the interior of the car communicate at their inlets with the interior of the hood, and accordingly are operative to effect ventilation when the automobile is at rest and the motor idling, the flow of air through such channel means being induced by the motor fan under drive of the idling motor.

From the above, it will be apparent that the various forms of my invention are capable of being installed substantially wholly concealed in an automobile body. With the use of my invention, the wind shield may be constructed to be in permanently closed position, or if desired, may be elevated or otherwise open as in existing wind shield constructions, for taxies or other chauffeur driven bodies having partitions between the driver's seat and the rearward portion of the car body.

Whereas, I have described my invention by reference to specific forms thereof it will be understood that many changes and modifications may be made without departing from the spirit of the invention.

I claim:

1. A ventilating system for an automobile body and having channel means disposed at the top of the automobile body and having an inlet communicating with the atmosphere at the front side of the body, passage means communicating at its inlet with the interior of the body and at its outlet with said channel means to dispose said passage means at an acute angle to the direction of length of said channel means, channel means disposed at the bottom of the body and having inlet means communicating with the interior of the hood of the automobile and passage means communicating at its inlet with the interior of the body and communicating at its outlet with said second-named channel means to dispose said second-named ventilating passages at an acute angle with the direction of length of said second-named channel means.

2. A ventilating system for an automobile body and having channel means disposed at the top of the automobile body and having an inlet communicating with the atmosphere at the front side of the body, passage means communicating at its inlet with the interior of the body and at its outlet with said channel means to dispose said passage means at an acute angle to the direction of length of said channel means, channel means disposed at the bottom of the body and having inlet means communicating with the interior of the hood of the automobile, passage means communicating at its inlet with the interior of the body and communicating at its outlet with said second-named channel means to dispose said second-named ventilating passages at an acute angle with the direction of length of said second-named channel means and means disposed posteriorly of said second-named passage means for regulating the extent of flow of heated air through said second-named channel means.

3. In combination with an automobile body including a top structure having substantially spaced upper and lower walls, one or more ventilating tubes running substantially longitudinally through said structure between its upper and lower walls and having front and rear openings to atmosphere external to the body, said front openings being substantially flared to facilitated entry of air, and a plurality of ventilating passages extending through said lower wall of the top structure and each having an opening communicating with the interior of the body and also joining one of said tubes at an acute rearwardly convergent angle, whereby air passing through said ventilating tubes induces a flow of air from the body through said passages into the tubes, a main air pipe extending longitudinally of a lower portion of the automobile body having its rear end open to atmosphere and having its front end flared and subject to air draft produced by the forward movement of the automobile to effect air flow through said main air pipe, and branch pipe means joining at one end said main air pipe at an acute rearwardly convergent angle and open at its opposite end to the interior of the automobile body.

4. In combination with an automobile body including a top structure having substantially spaced upper and lower walls, parallel air tubes extending through said top structure between the upper and lower walls thereof, said tubes throughout the major portions of their lengths being of substantially uniform cross section and having lateral dimensions much shorter than the width of said top structure, the tubes at their forward ends being outwardly flared forming combined tube openings which extend substantially across the front of the top structure, the rear ends of the tubes having openings external to the top structure at the rear end thereof, and additional relatively short ventilating tubes communicating with the main tubes at acute rearwardly directed angles and each having a flared opening through said lower wall of the top structure to the interior of the body.

5. Ventilating apparatus for a vehicle, comprising a main ventilating tube running substantially longitudinally through the top structure and having front and rear openings to atmosphere external of the vehicle body, passage means extending through the lower part of the top structure joining at one end with said ventilating tube at an acute rearwardly convergent angle and open at the opposite end to the interior of the vehicle body, a main air pipe extending longitudinally below the lower portion of the vehicle body having its rear end open to atmosphere and its front end flared and subject to air draft produced by the forward movement of the vehicle to effect air flow rearwardly through said main air pipe, branch pipe means joining said main air pipe at one end at an acute rearwardly convergent angle and open at its opposite end to the interior of the vehicle, and means for regulating the flow of air through said main air pipe.

6. Ventilating apparatus for a vehicle, comprising a main ventilating tube running substantially longitudinally through the top structure and having front and rear openings to atmosphere external of the vehicle body, passage means extending through the lower part of the top structure joining at one end with said ventilating tube at an acute rearwardly convergent angle and open at the opposite end to the interior of the vehicle body, a main air pipe extending longitudinally below the lower portion of the vehicle body having its rear end open to atmosphere and its front end flared and subject to air draft induced by the motor fan to effect air flow rearwardly through said main air pipe, branch pipe means joining said main air pipe at one end at an acute rearwardly convergent angle and open at its opposite end to the interior of the vehicle, and means for regulating the flow of air through said main air pipe.

In testimony whereof I have signed this specification this 31st day of August, 1926.

HENRY J. LUCKE.